United States Patent [19]
van den Heuvel et al.

[11] Patent Number: 4,860,312
[45] Date of Patent: Aug. 22, 1989

[54] QUALITY IMPROVEMENT FOR A DIGITALLY TRANSMITTED INFORMATION SIGNAL

[75] Inventors: Anthony P. van den Heuvel, Arlington Heights; Michael D. Kotzin, Buffalo Grove; Kenneth J. Crisler, Wheaton, all of Ill.

[73] Assignee: Motorola, Inc., Schaumburg, Ill.

[21] Appl. No.: 184,305

[22] Filed: Apr. 12, 1988

[51] Int. Cl.$^4$ .............................. H04B 14/04
[52] U.S. Cl. ............................ 375/26; 371/67; 341/163
[58] Field of Search ............. 375/25, 26, 32, 75, 375/76, 30, 57, 58, 99; 371/67, 68; 341/158, 163, 166

[56] References Cited

U.S. PATENT DOCUMENTS

| | | | |
|---|---|---|---|
| 4,010,422 | 3/1977 | Wouda | 375/26 |
| 4,347,619 | 8/1982 | Dakin et al. | 375/37 |
| 4,513,426 | 4/1985 | Jayant | 375/26 |
| 4,559,523 | 12/1985 | Wakita | 341/163 |
| 4,646,322 | 2/1987 | Flanagin et al. | 375/32 |
| 4,651,328 | 3/1987 | den Hollander et al. | 375/25 |
| 4,719,642 | 1/1988 | Lucas | 375/30 |

Primary Examiner—Robert L. Griffin
Assistant Examiner—Stephen Chin
Attorney, Agent, or Firm—Wayne J. Egan; Thomas G. Berry

[57] ABSTRACT

In a digital communication system, a residual signal is generated, encoded, and combined with an encoded information signal in a manner that does not appreciably degrade the encoded information signal. The information contained within the residual signal may be used by the receivers to improve the quality of the recovered signal. The residual signal is modulated such that it may only be recovered when the signal-to-noise ratio is sufficiently high. In this way, the quality of the recovered signal improves with increased signal-to-noise ratio.

16 Claims, 1 Drawing Sheet

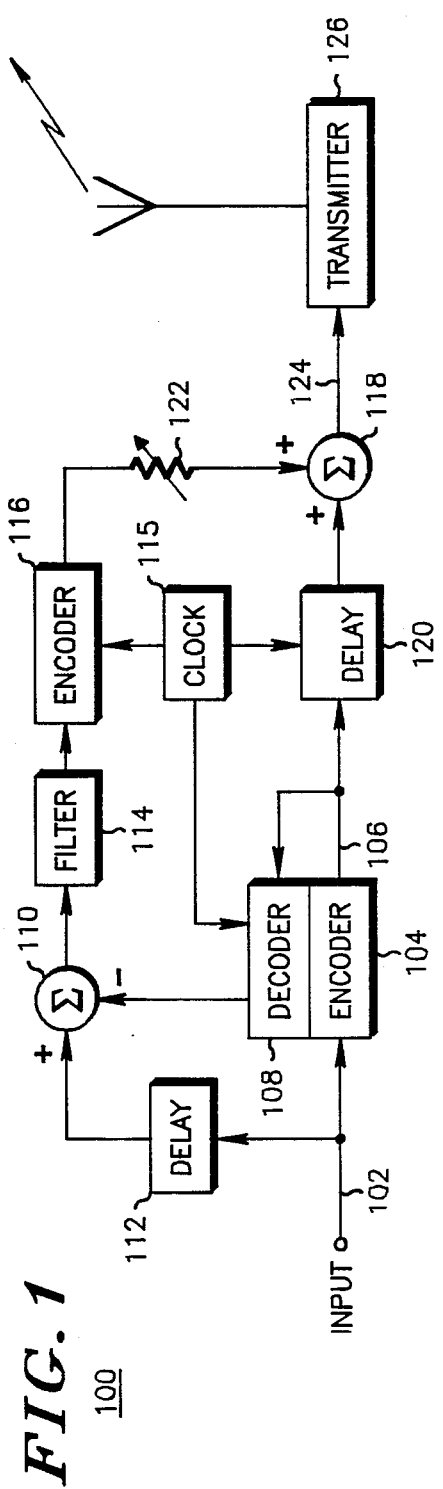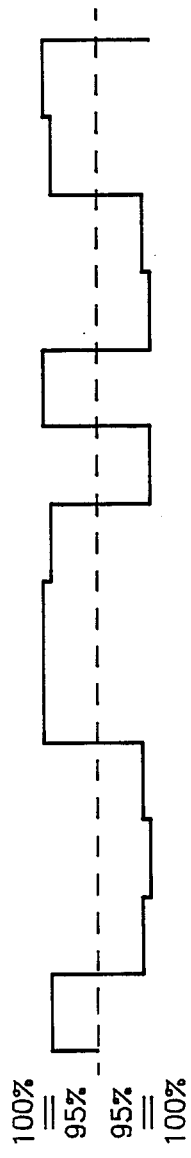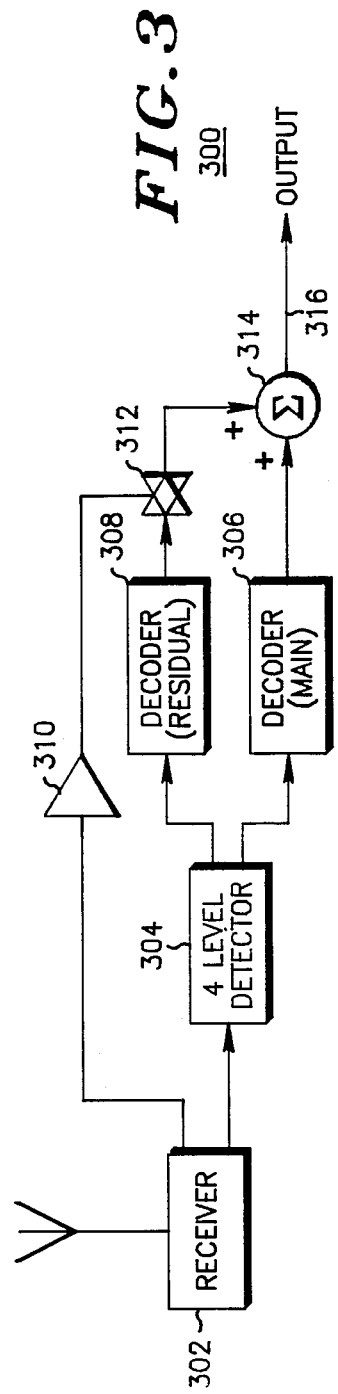

QUALITY IMPROVEMENT FOR A DIGITALLY TRANSMITTED INFORMATION SIGNAL

TECHNICAL FIELD

This invention relates generally to radio frequency communication, and more specifically to radio frequency communication systems that digitally modulate an information signal onto a radio frequency communication channel, and is more particularly directed toward a speech quality improvement for a digitally modulated voice signal.

BACKGROUND ART

Radio frequency communication systems employing digital modulation are constrained to operate using contemporary radio frequency communication channels that have a limited bandwidth. Due to this bandwidth limitation, information coded at moderate rates (12–16 kb/s) are generally recovered with poor quality even when the signal-to-noise ratio (SNR) is higher than necessary for low-error detection of a digitally modulated signal. For example, a recovered voice signal that has been digitally encoded and modulated at 12 kb/s is generally perceived to have a lower audio quality than the same voice signal communicated with narrow-band FM analog techniques. Moreover, a particularly undesirable characteristic of conventional digital communication systems is that the quality of the recovered signal does not improve with increased SNR as does an analog narrow-band FM system. Significantly, while most communication systems are designed to permit communications at low SNRs, most communications take place at high SNRs. Thus, this detriment becomes more pronounced.

SUMMARY OF THE INVENTION

Accordingly, it is an object of the present invention to provide an improved digital communication system.

It is another object of the present invention to provide a digital communication system having improved recovered signal quality.

It is a further object of the present invention to provide a digital communication system having a recovered signal quality that improves with increased signal-to-noise ratio.

Briefly, according to the invention, an information signal is digitally encoded into a first data signal for transmission over a radio frequency communication channel. Additionally, a residual signal representing the difference between the original information signal and the ideal reconstruction of the first data signal, is digitally encoded into a second data signal. The first and second data signals are combined and modulated onto a radio frequency carrier in a manner that does not appreciably degrade the ability to recover at least the first data signal. The information contained within the second data signal may be used by the receivers to improve the quality of the recovered signal. The second data signal is modulated such that it may only be recovered when the signal-to-noise ratio is sufficiently high. In this way, the quality of the recovered signal improves with increased signal-to-noise ratio.

BRIEF DESCRIPTION OF THE DRAWINGS

FIG. 1 is a block diagram of a transmitter according to the present invention;

FIG. 2 is an illustration of the multi-level signal according to the present invention;

FIG. 3 is a block diagram of a receiver according to the present invention.

DETAILED DESCRIPTION OF THE PREFERRED EMBODIMENT

Referring now to FIG. 1, there is shown a block diagram of a transmitter (100) according to the present invention. An information signal, such as a voice signal, is received at an input port (102) and routed to an encoder (104). Preferably, the encoder comprises a Continuously Variable Slope Delta-modulator (CVSD), such as, for example, an MC3417 manufactured by Motorola, Inc., or its functional equivalent.

The encoder (104) operates to produce an encoded first data signal (106), which is routed to a decoder (108). The decoder (108) (which may be an inherent part of the encoder (104)) operates to reconstruct an approximation of the information signal that differs only in any encoding and decoding errors generated by the encoder (104) and the decoder (108). The decoded signal is combined (110) with a delayed (112) version of the information signal from the input port (102). Preferably, the delay element (112) comprises a Bessel delay filter, which is constructed and arranged to provide an appropriate delay interval to compensate for the encoding and decoding process of the information signal.

The signal from the combiner (subtractor) (110) comprises a residual (error) signal representing the difference between the actual information signal and the encoded/decoded information signal. This residual signal is filtered (114) with a lowpass filter to remove any high frequency spectral components. Preferably, the filter (114) comprises a fourth order lowpass filter having a 3 kHz 3 dB corner.

The residual signal is digitally encoded into a second data signal at an identical rate (115) as the information signal in a second encoder (116). The second encoder (106) uses an algorithm identical to that of the first encoder (104), but operates with different parameters due to the different amplitude and signal characteristics of the residual signal. The second data signal is combined (summed) (118) with a delayed (120) version of the encoded information signal (106) to provide a combined signal (124). Preferably, the first data signal is digitally delayed to compensate for the propagation delay through the decoder (108), the combiner (110), and filter (114). The delay element (120) may comprise an MC14015B, manufactured by Motorola, Inc. or its functional equivalent. Lastly, the combined signal (124) is coupled to any suitable transmitter (126) for transmission over a radio frequency channel.

The rate at which the encoded residual signal is superimposed or modulated onto the encoded information signal is controlled (122) so as not to significantly degrade from the reception of the encoded information signal. The result, is that the combined signal (124) comprises a multi-level digital signal, the preferred form of which is represented in FIG. 2.

As can be seen in FIG. 2, the residual signal is preferably modulated to comprise approximately a 5% deviation from the encoded information signal. Of course, other modulation amounts may be used, however, the present invention prefers a low level deviation on the second data signal so as not to interfere or compromise the reception of the first data signal. This distinguishes the present invention from conventional digital multi-level modulation practice. Since the two data signals are independent, and recovery of the second data signal is unnecessary for minimum acceptable communication, the second data signal may be sent with less power. Accordingly, the present invention prefers that the second data signal deviation is controlled such that only receiving units having a strong signal-to-noise ratio would be able to properly distinguish the second data signal from the encoded information signal (first data signal) that had been subject to noise and other adverse transmission phenomenon prior to reception.

Referring now to FIG. 3, a block diagram of a receiver (300) according to the present invention is shown. A receiving unit (302) recovers the transmitted signal, which preferably comprises at least the encoded information signal (first data signal) having the encoded residual signal (second data signal) combined therewith. The received signal is routed to a four-level detector (304), which may be of conventional design and operates to recover the encoded information signal in a main decoder (306), and the encoded residual signal in a second decoder (308). Both the main decoder (306) and the residual decoder (308) may be realized as an MC3417 manufactured by Motorola, Inc. or its functional equivalent.

According to the present invention, the second decoder (308) will only be able to properly decode the encoded residual signal when the signal-to-noise ratio is sufficiently high. At other times, the decoder (308) will not be able to properly recover the encoded residual signal, but instead will provide an arbitrary data stream representing noise. Accordingly, a signal strength detector (310) is coupled to the receiving unit (302) and controls a transmission gate (312) that permits the combination (314) of the decoded information signal and the decoded residual signal only when the received signal strength is sufficiently high. The threshold of the signal strength detector (310) may be adjusted to correspond with a received signal strength that represents a suitable signal-to-noise ratio of the radio frequency channel that the particular receiver (300) is operating upon. Since the decoded residual signal represents the encode/decode error created at the transmitter, this error is combined (summed) with the recovered information signal, which provides an improved recovered signal that more closely resembles the original information signal. The recovered signal is provided at an output port (316) so that the recovered signal may be routed to any further processing or recovery circuits (not shown).

Thus, the present invention operates to generate a residual signal that is encoded and modulated onto an encoded information signal so as not to degrade the quality of the encoded information signal. The low-level modulation applied to the encoded residual signal produces a multi-level signal that may only be properly recovered at sufficiently high signal-to-noise ratios. In this way, the present invention affords an improved recovered signal quality in good transmission conditions (i.e., high signal-to-noise ratio) without appreciably detracting from the quality of other receivers that are only capable of recovering the encoded information signal (due to a lower signal-to-noise ratio).

What is claimed is:

1. In a radio frequency communication system, a transmitter apparatus comprising:
    means for encoding an information signal to provide an information data signal;
    means for decoding said information data signal to provide a decoded signal;
    means for combining said information signal and said decoded signal to provide an error signal;
    means for encoding said error signal to provide an error data signal;
    level-controlling means for controlling the level of said error data signal to provide a low-level error data signal, the level of said low-level error data signal being sufficiently low so as not to substantially degrade the reception of said information data signal;
    combining means for combining said low-level error data signal and said information data signal to provide a combined data signal; and
    means for transmitting at least said combined data signal.

2. The apparatus of claim 1, wherein said means for encoding said information signal comprises a continuously variable slope delta ("CVSD") modulation encoder.

3. The apparatus of claim 2, wherein said means for decoding said information data signal comprises a CVSD modulation decoder.

4. The apparatus of claim 3, wherein said means for combining said information signal and said decoded signal comprises a subtractor circuit.

5. The apparatus of claim 4, wherein said means for encoding said error signal comprises a CVSD modulation encoder.

6. The apparatus of claim 5, wherein said combining means for combining said low-level error data signal and said information data signal comprises a summing circuit.

7. In a radio frequency communication system, a transmitter apparatus comprising:
    means for encoding an information signal to provide an encoded information signal;
    means for delaying said information signal to provide a delayed information signal;
    means for decoding said encoded information signal to provide a decoded signal;
    means for combining said delayed information signal and said decoded signal to provide an error signal;
    means for encoding said error signal to provide an encoded error signal;
    means for delaying said encoded information signal to provide a delayed encoded information signal;
    means for combining said encoded error signal and said delayed encoded information signal to provide a combined signal; and
    means for transmitting at least said combined signal.

8. In a radio frequency communication system having a transmitted signal comprising an information data signal combined with a low-level error data signal, the level of said low-level error data signal being sufficiently low so as to not substantially degrade the reception of said information data signal, a receiver apparatus comprising:
    means for receiving said transmitted signal to provide a received signal;
    signal strength detector means for providing a control signal upon determination that said received signal has a level at least equal to a predetermined threshold;
    multi-level data detector means responsive to said received signal for recovering said information data signal and for recovering said low-level error data signal;

first means for decoding said information data signal to provide an information signal;

second means for decoding said low-level error data signal to provide an error signal;

means for combining said information signal and said error signal in response to said control signal.

9. The apparatus of claim 8, wherein said first means for decoding said information data signal comprises a CVSD modulation decoder.

10. The apparatus of claim 9, wherein said second means for decoding said low-level error data signal comprises a CVSD modulation decoder.

11. A radio frequency communication apparatus, comprising:

a transmitter comprising;

means for encoding an information signal to provide an information data signal;

means for decoding said information data signal to provide a decoded signal;

means for combining said information signal and said decoded signal to provide an error signal;

means for encoding said error signal to provide an error data signal;

level-controlling means for controlling the level of said error data signal to provide a low-level error data signal, the level of said low-level error data signal being sufficiently low so as not to substantially degrade the reception of said information data signal;

combining means for combining said low-level error data signal and said information data signal to provide a combined data signal;

means for transmitting a transmitted signal based at least in part on said combined data signal;

at least one receiver comprising:

means for receiving said transmitted signal to provide a received signal based at least in part on said combined data signal;

signal strength detector means for providing a control signal upon determination that the received signal strength is at least equal to a predetermined threshold;

multi-level data detector means responsive to said received signal for recovering said information data signal and for recovering said low-level error data signal;

first means for decoding said information data signal to provide a received information signal;

second means for decoding said low-level error data signal to provide a received error signal;

means for combining said received information signal and said received error signal in response to said control signal.

12. In a radio frequency communication system, a method for processing and transmitting an information signal, comprising the steps of:

(a) encoding an information signal to provide an information data signal;

(b) decoding said information data signal to provide a decoded signal;

(c) combining said information signal and said decoded signal to provide an error signal;

(d) encoding said error signal to provide an error data signal;

(e) controlling the level of said error data signal to provide a low-level error data signal, the level of said low-level error data signal being sufficiently low so as not to substantially degrade the reception of said information data signal;

(f) combining said low-level error data signal and said information data signal to provide a combined data signal;

(g) transmitting at least said combined data signal.

13. The method of claim 12, wherein step (c) further comprises delaying said information signal by a first time interval to provide a delayed information signal, and combining said delayed information signal and said decoded signal to provide said error signal.

14. The method of claim 13, wherein step (f) further comprises delaying said information data signal by a second time interval to provide a delayed information data signal, and combining said low-level error data signal and said delayed information data signal to provide said combined data signal.

15. In a radio frequency communication system, a method for receiving and processing a transmitted signal, comprising the steps of:

(a) receiving a transmitted signal to provide a received signal;

(b) determining a value representing the strength of said received signal and providing a control signal if said value is at least above to a predetermined threshold;

(c) processing said received signal to recover a multi-level modulated information signal therefrom to provide at least a first and second data signal;

(d) decoding said first data signal to provide a first decoded signal;

(e) decoding said second data signal to provide a second decoded signal;

(f) combining said first decoded signal and said second decoded signal in response to said control signal.

16. In a radio frequency communication system, a method for communicating an information signal, comprising the steps of:

at a transmitter:

(a) encoding an information signal to provide an encoded information signal;

(b) decoding said encoded information signal to provide a decoded signal;

(c) combining said information signal and said decoded signal to provide an error signal;

(d) encoding said error signal to provide an encoded error signal;

(e) combining said encoded error signal and said encoded information signal to provide a combined signal;

(f) transmitting at least said combined signal;

at a receiver:

(a) receiving a transmitted signal to provide a received signal;

(b) determining a value representing the strength of said received signal and providing a control signal if said value is at least equal to a predetermined threshold;

(c) processing said received signal to recover a multi-level modulated information signal therefrom to provide at least a first and second data signal;

(d) decoding said first data signal to provide a first decoded signal;

(e) decoding said second data signal to provide a second decoded signal;

(f) combining said first decoded signal and said second decoded signal in response to said control signal.

* * * * *